June 6, 1961 L. R. ORD 2,987,310
PUMPING RECUPERATOR FOR HYDRAULIC CHAMBERS
Filed Oct. 5, 1956 3 Sheets-Sheet 1

INVENTOR.
LEWIS R. ORD
BY
Reynolds, Beach & Christensen
ATTORNEYS

June 6, 1961  L. R. ORD  2,987,310
PUMPING RECUPERATOR FOR HYDRAULIC CHAMBERS
Filed Oct. 5, 1956  3 Sheets-Sheet 2

INVENTOR.
LEWIS R. ORD
BY
Reynolds, Beach & Christensen
ATTORNEYS

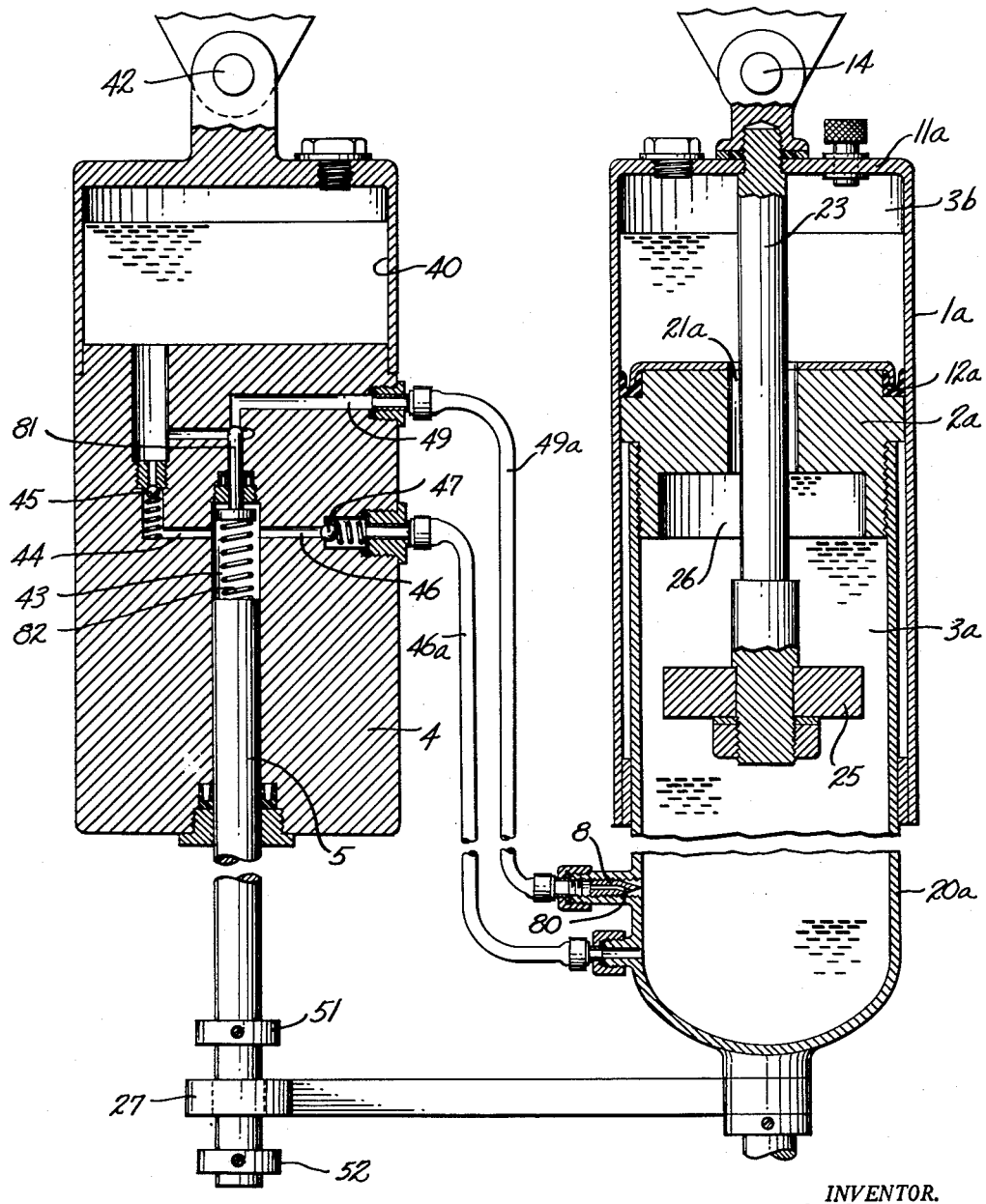

United States Patent Office 2,987,310
Patented June 6, 1961

2,987,310
PUMPING RECUPERATOR FOR HYDRAULIC CHAMBERS
Lewis R. Ord, 242 The Kingsway, Toronto, Ontario, Canada
Filed Oct. 5, 1956, Ser. No. 614,195
13 Claims. (Cl. 267—64)

Hydraulic chambers such as liquid springs, oleopneumatic shock absorbers, and pressure accumulators are often subject, in use, to rather rapid and repeated fluctuations in the liquid cubic volume contained within the hydraulic chamber. Such changes in cubic volume might occur, with no intended change in mass volume, by reason of compression, followed by resilient restoration, of a constant mass volume of liquid in a liquid spring or oleopneumatic shock absorber used between the wheels and the body of a road vehicle. Notwithstanding the intention to maintain a constant mass volume, leakage is apt to occur, producing a change in the contained mass volume at static load, and, in addition, thermal effects may cause changes in the contained cubic volume of liquid, especially in lower pressure chambers. Whatever the cause of such changed mass volume, hereinafter referred to merely as "volume," the effect thereof is to cause a change in or displacement of the normal range of movement of the relatively reciprocating parts, which in itself is not ordinarily permissible, and with the end result, in some cases, that air may be drawn into the hydraulic chamber, when, as in a liquid spring, there should be no air within it, or the volume of air, as in an oleopneumatic shock absorber or pressure accumulator, may be increased beyond the volume required, and the springing characteristics and length of the hydraulic device may be permanently altered.

It is a primary object of the present invention to provide a pumping recuperator for use in conjunction with such a hydraulic chamber, which will serve to supply any liquid lost, by leakage or otherwise, automatically, and so will serve to maintain the contained liquid volume substantially constant under all conditions. Thus, the range and characteristics of the hydraulic device will be unchanged, and it will continue to function as intended.

More specifically, it is an object to provide a pumping recuperator of the character described, which during operation within its normal range will not need to supply any additional liquid to the hydraulic chamber (except as a calibrated leakage device, hereinafter mentioned, may be incorporated in it), but will merely pump idly, or not at all, until such time as a deficiency of liquid in the chamber arises, and which will then automatically be caused to supply a sufficient quantity of liquid to make up the deficiency, and then will cease further pumping into the hydraulic chamber until a deficiency reoccurs.

According to this invention, the mechanism which will start and stop the pumping operation, as just indicated, is adjustable so that the point at which or the limits of the range beyond which recuperation begins and ends may be varied to suit the requirements of the specific installation.

Further, according to this invention, it may be desirable to provide a controlled and substantially constant leakage of small amount from the hydraulic chamber, whereby the pumping recuperator will normally and continuously from time to time as may be required, pump a small amount from a reservoir into the hydraulic chamber, to make up the amount lost through this controlled leakage means, plus any amount that may be lost by uncontrolled leakage. Furthermore, by providing such a controlled leakage, provision is made against the possibility of an excessive quantity of liquid being pumped into or remaining in the hydraulic chamber, for this, too, would alter the characteristics of the hydraulic device. In consequence, means are provided to guard against an undersupply and against an oversupply, respectively, of liquid into the hydraulic chamber. Such controlled leakage device is self-regulating to relieve any excess of liquid from the hydraulic chamber after static conditions occur, until the volume therein falls to a value within the normal range of values.

The recuperator of this invention is independent of the hydraulic chamber which it serves, in the sense that regardless of the type of hydraulic chamber, whether it be a liquid spring, an oleopneumatic shock absorber, a pressure accumulator, or other such device, the recuperator is arranged to function automatically as required by fluctuations in the contained volume within such hydraulic chamber. The recuperator's primary function is to supply additional liquid to the hydraulic chamber to make up any loss therein, as evidenced by fluctuation in the contained liquid volume below a given lower limit of the normal range of fluctuations. This it does by means of a pump that includes a pump chamber connected to a reservoir and to the hydraulic chamber, valves to direct the liquid to the latter, and a pump plunger reciprocative within the pump chamber, at least during fluctuations beyond the lower limit. A metering device, whether mechanical in an interconnection between the hydraulic chamber and the pump plunger, or hydraulic in the passages connected to the pump chamber, is sensitive to all fluctuations within the hydraulic chamber, and incorporates a lost-motion device whereby during fluctuations within the normal range the pump plunger either is not reciprocated at all, or reciprocates idly. In either case the effect is that the pump is not operative to supply additional liquid to the hydraulic chamber during fluctuations within the normal range, but whenever the fluctuations pass the lower limit of that range, indicating a deficiency of liquid within the hydraulic chamber, the pump is automatically placed in operation and placed in operative relation to the hydraulic chamber, to supply liquid to the latter. This continues until fluctuations below the lower limit cease, whereupon the pump, by the action of the metering device, becomes inoperative.

The recuperator preferably has an important secondary function, namely, to insure against the possibility of an excessive liquid volume within the hydraulic chamber. Such an excessive volume might result from excessive operation of the pump of the recuperator. To avoid this, it is preferred that provision be made for bleeding off continuously a small volume of liquid from the hydraulic chamber, coupled with a sensitive valve which will remain seated to halt such leakage except when an oversupply of liquid is present or is assured as needed, by operation of the pump. The valve is so coupled to the pump plunger that the force by which it is held seated is adequate except when the pressure in the hydraulic chamber, such as would be increased by an excessive contained volume, is overly high, or during a suction stroke of the pump plunger, during which brief period the effect of the controlled leakage on supply to the pump chamber, or on the total volume within the hydraulic chamber, is negligible.

Further, according to this invention, the pumping recuperator may take various forms and be coordinated in various ways with the operation of the hydraulic device which it serves, and alternative forms thereof are shown in the accompanying drawings.

This invention comprises the structure the principles whereof are shown and described herein, and the method of automatically maintaining the liquid volume within a hydraulic device such as is herein described substantially constant under static load conditions.

FIGURE 4 is a diagrammatic axial sectional view, similar to FIGURE 1, but showing a modified form of pumping recuperator operatively associated with an oleo-pneumatic shock obsorber.

Figure 1:
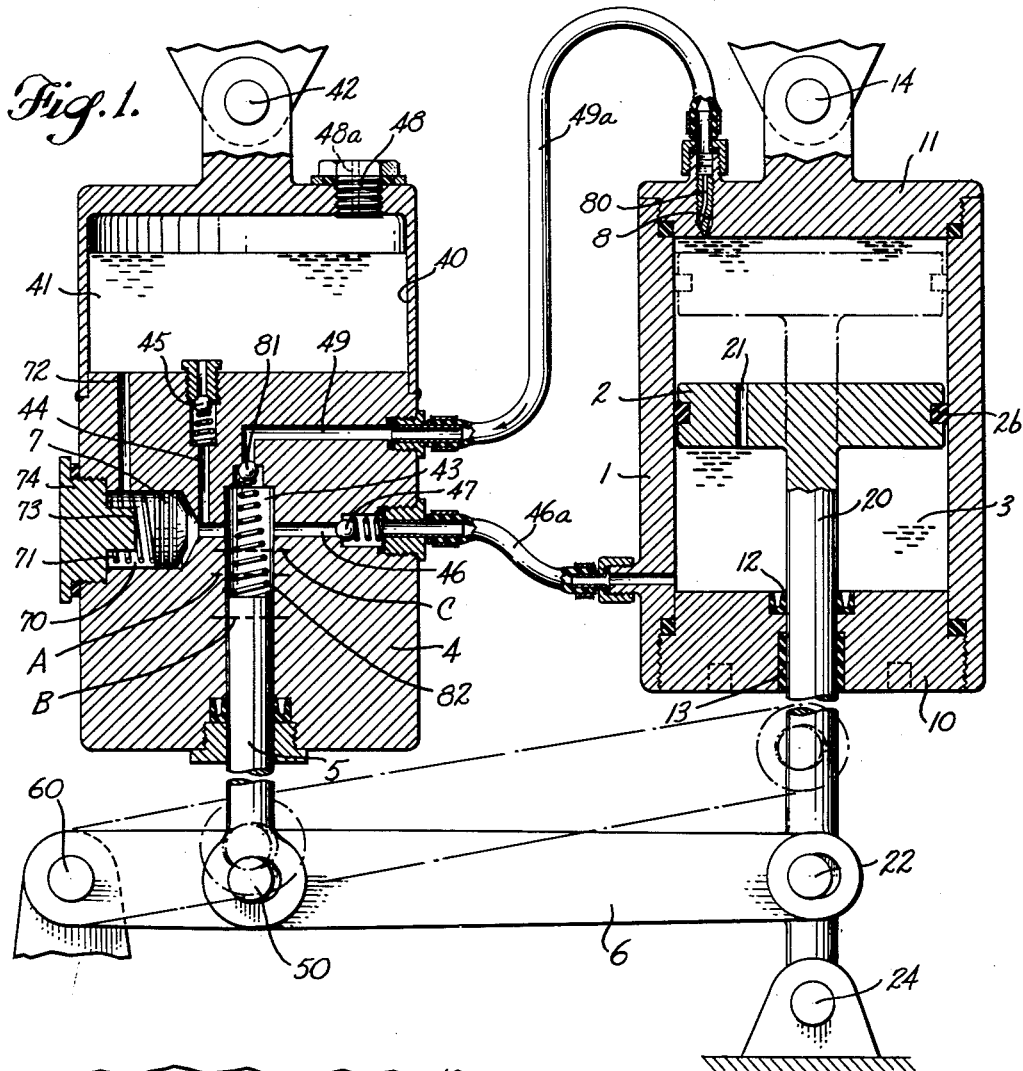
FIGURE 1 is a diagrammatic showing, in axial section, of a liquid spring and a separate recuperator operatively connected thereto, showing parts in a substantially static load condition.

By way if illustration, the pumping recuperator is shown in FIGURE 1 in operative relationship to a liquid spring of the type wherein a cylinder 1, completely closed by heads 10 and 11, defines a hydraulic chamber 3 which is completely filled with a resiliently compressible liquid, with the exception of such space as is occupied within it by a piston 2 and piston rod 20. The piston may be considered to be located more or less centrally between the heads 10 and 11, when parts are in the static load condition, and the piston rod 20 projects through suitable glanding, diagrammatically illustrated at 12 and 13, to the exterior of one head, where it is connected at 24 to one of a reciprocating pair, motion between which is to be absorbed resiliently, as the opposite head 11 is connected at 14 to the other of the reciprocatory pair. Compressional forces tending to cause approach of the two members of the reciprocatory pair tends to move the piston 2 from the full line towards the dot-dash line position of FIGURE 1, and the greater volume of the piston rod thus entered into the completely liquid-filled chamber 3 compresses the liquid, and by the resilience thereof causes rebound of the piston when the compressive load is removed. A restricted orifice 21 suggests any known or suitable means for damping this rebound, since the seal at 2b requires all movement of liquid to flow through the orifice 21.

Because the piston rod must have reasonable freedom of movement in the head 10, despite the high pressures occurring within the chamber 3, leakage may occur past the glanding at 12 and 13, or where the heads are joined to the cylinder 1. Temperature effects are not so likely to affect the volume of the liquid, if the pressures within the chamber are high, as ordinarily they would be, and yet it may be desired to use a low pressure liquid spring, or other low pressure hydraulic device, and in such case temperature effects will be of greater moment to change the liquid volume.

The recuperator comprises a body 4, chambered to define a reservoir at 40, in which is stored a liquid 41 identical with the liquid within the hydraulic chamber 3 of the liquid spring. The body 4 is connected at 42 to the same sprung member as is the connection at 14. The body 4 is also formed with a bore 43 which constitutes a pump chamber, within which a pump plunger 5 is reciprocable.

Liquid from the reservoir 40 is admitted to the pump chamber 43 by way of a passage 44 controlled by a non-return valve 45 (shown as spring-seated, but not necessarily so arranged), and this liquid is discharged from the pump chamber 43 by way of a passage 44, controlled by a non-return valve 47. The passage 46 extends by a non-expansive tube or connection 46a to the interior 3 of the liquid spring. A filler cap 48 enables replenishing of the liquid within the reservoir 40, and would ordinarily be perforated (as indicated by the dash lines 48a) so that the liquid 41 and the air thereabove within the reservoir would not themselves be pressurized.

The pump plunger is operatively connected to and co-ordinated in its movements with the piston rod 20. This may be done in any of a variety of ways, and such co-ordination and interconnection is suggested by the lever 6 fulcrumed at 60, the shorter arm whereof is connected at 50 to the pump plunger 5 and the longer arm at 22 to the piston rod 20. The fulcrum 60 may be fixed with relation to the connections 42 and 14, or otherwise. As the piston rod 20 reciprocates within its hydraulic chamber 3, the pump plunger 5 reciprocates within its pump chamber 43, although at a lesser amplitude, according to the mechanical advantage of the linkage.

The pumping action of the pump plunger 5 that accompanies reciprocation of the piston rod 20 into and from the hydraulic chamber 3 does not, until its amplitude exceeds the normal range, produce any flow from the reservoir 40 by way of the pump chamber 43 into the hydraulic chamber 1, because of a metering device employed that measures the amplitude of the reciprocation of plunger 20, and only initiates pumping action by the pump plunger 5 when such amplitude is exceeded. In the form shown in FIGURE 1 this metering device takes the form of a floating piston 7, which is desirably a lap fit within a metering chamber 70 in the body 4. The floating piston 7 is biased, as by a spring 71, to remain in its right-hand position as viewed in FIGURE 1, but by the pressure developed by the pressure stroke of the pump plunger 5, this floating piston 7 is pressed to the left in opposition to its spring 71, and since the space behind the floating piston 7 is in free communication with the reservoir 40 by means of a passage 72, the liquid behind the floating piston is merely displaced back into the reservoir, with no opposing force. This is the situation during reciprocation of the pump plunger 5, and consequently of reciprocation of the piston rod 20, throughout their normal range of movement which is indicated approximately by the lines A and B.

Should a deficiency of liquid volume occur within the chamber 3, allowing farther entry than normal of the piston rod 20 within the chamber 3, the pump plunger will be permitted to move past its normal low limit A; for instance, towards or to a limit C. The volume in the metering chamber 70 is so calculated, and an abutment 73 is placed to the rear of the floating piston at such a position, that when the movement of the pump plunger 5 exceeds its normal limit A, the floating piston 7 will bottom upon the abutment 73, and when this occurs pressure will build up in the pump chamber 43 to an extent to unseat the valve 47, the spring whereof is sufficiently stronger than the spring 71 that it will not open under movement within the normal range of the pump plunger, and the liquid within the pump chamber will now be displaced by way of passage 46 and tube 46a into the hydraulic chamber 3, to augment the liquid within that hydraulic chamber 3. On the suction stroke of the pump plunger 5, the displaced liquid is replaced past the nonreturn valve 45, providing the floating piston 7 has been pushed by its spring 71 to the right-hand limit of its travel. This cycle will continue until, by virtue of the build-up of liquid volume at 3, the pump plunger no longer moves past its limit A. At that time further supply of liquid to the chamber 3 ceases automatically. Should static conditions obtain while there is some excess of liquid within the hydraulic chamber 3, this excess will be relieved by the controlled leakage device about to be described, until the piston 2 is positioned within its normal range of reciprocation.

It will usually be desirable to provide a small calibrated leakage which continues at all times during operation, and which will serve to relieve any excess of liquid that might tend to enter the chamber at 3, and which also would serve to relieve any excess of volume resulting from thermal effects, or remaining from operation upon the advent of static conditions. The precise manner of accomplishing this may vary widely, and the construction illustrated is intended only as suggestive. As shown, a needle valve 8, having a bore 80, communicates with the pump chamber 43 by way of the passage 49 and the non-expansive pipeline 49a, past a normally seated valve 81, which under static conditions is urged towards its seat by a spring 82, the force of which under static conditions is calculated to be sufficient to hold the valve seated and to halt the leakage, unless an excess of liquid within the hydraulic chamber 3 generates a super-normal pressure therein. During operation, the compression spring 82 being interposed within the pump chamber 43 between the valve 81 and the end of the pump plunger 5, each pressure stroke of the pump plunger increases the force of the spring 82, and the non-return valve 81 is thereby held strongly to its seat, so that no liquid can pass from the pump chamber to the hydraulic chamber by way of the passage 49. However, on the suction stroke of the pump plunger, or if during static conditions there is an excess of liquid in the hydraulic chamber 3, the calibrated amount of leakage, according to the setting of the needle valve 8, again passes from the body of liquid within chamber 3 into the pump chamber at 43. If or whenever this diminution of the volume of liquid at 3 continues to an extent sufficient to permit the pump plunger to pass beyond its normal limit at A, then the amount required to make up the deficiency will be pumped in the manner already described back into the chamber 3.

Should the volume within hydraulic chamber 3 increase in excess of the normal volume, the pump plunger 5 will correspondingly lower beyond the high limit B. This decreases the force of the light spring 82, and the excess liquid will return to pump chamber 43, since the now even more lightly seated non-return valve 81 will not hold against the pressure in hydraulic chamber 3. Leakage from the pump chamber 43 past the floating piston 7 will soon eliminate any such excess volume, and return the piston 2 and the pump plunger 5 to their normal ranges of movement. Such slight amount of leakage as occurs by way of passage 49 during a suction stroke of the plunger 5 is negligible, since it is kept to a minimum by the needle valve 8.

Thus the liquid volume within this hydraulic chamber 3 is maintained always at the prescribed amount, or within prescribed narrow limits, whether temporary conditions cause a decrease or an excess in such liquid volume.

It may be noted that the abutment 73 is formed as part of a plug 74 which is adjustable within the body 4, so that the location of the abutment along the path of reciprocation of the floating piston 7 is adjustable. In this way or in any convenient manner the location of the limit at A, where pumping commences, and by association, of the limit at B, is adjustable. Any seepage past the floating piston 7 is relieved into the reservoir 40 by way of the passage 72, and is made up by the pumping action of the pump plunger 5.

It will be recalled that the floating piston 7 within the metering chamber 70 was cited as an example of a metering device to measure the normal range of reciprocatory movement of the piston 2, and to initiate pumping action of the recuperator where such reciprocatory movement exceeds in amplitude its normal range, or the one limit of that range is shifted by temporary conditions. Another example of a metering device to the same end but in a different form is shown in FIGURE 4.

Figure 2:
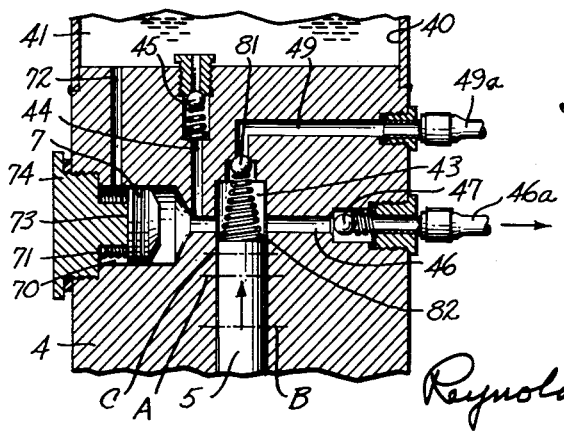
FIGURE 2 is a similar view of the pumping recuperator, showing parts in their pumping relationship, for supplying a deficiency in the hydraulic chamber, not shown in this view.

The device as illustrated in the form of FIGURES 1 and 2 is associated with a liquid spring, and is formed separately therefrom. In the form shown in FIGURE 4, the recuperator of this invention is diagrammatically shown in conjunction with an oleopneumatic shock absorber, but still is built separately therefrom. The hydraulic cylinder 1a, closed at its end 11a, is as before, connected at 14 to one of two relatively movable members, its piston 2a is reciprocable therein within and glanded at 12a with respect to a chamber partly filled with liquid at 3a, leaving a space 3b which is filled with air under pressure. The piston rod 20a is in the form of a tube which is reciprocable relative to and projects from the open end of the cylinder 1a, and is connected to the second member of the relatively movable pair. The body 4 with its liquid reservoir 40 is separate from the cylinder 1a, and the body 4 contains and connects with the passages 46, 46a, and 49, 49a connecting to the liquid space 3a within the cylinder 1a. The rod 23 is fixed to the head 11a, and may carry a head 25 that enters a depression 26 in the piston 2a as the parts approach full extension, to damp final movement to that position. Flow of liquid between opposite sides of the piston is by way of the restricted orifice 21a, which may be varied or metered, in known manner. These details are immaterial, and are chosen merely for illustration of the principles involved.

The pump plunger 5, as previously described, is reciprocable within the pump chamber 43 of the body 4. The body 4 is connected to the oleopneumatic unit cylinder 1a, so that they move in unison, and the pump plunger 5 is connected for movement under certain conditions to the piston 2a and tube 20a of the oleopneumatic unit. There is no floating piston in this form, and the metering device here assumes the form of two collars 51 and 52, spaced apart along the pump plunger 5, and adjustably fixed in position lengthwise thereof, together with an intermediate collar 27 which is reciprocable with the tube 20a and piston 2a. As the piston 2a reciprocates within its normal range the intermediate collar 27 moves back and forth between the collars 51, 52, without contacting either, hence without effecting actual reciprocation of the pump plunger 5. Whenever reciprocation of the piston 2a and tube 20a exceeds the upper limit of their normal range, intermediate collar 27 contacts collar 51 and effects a compressive stroke of the pump plunger 5. In just the same manner as described previously, reciprocation beyond the limits of the normal range of the piston 2a, or an excess of liquid remaining in the chamber 3a, automatically effects compensating action, so that the relative reciprocation of the piston and cylinder 2a, 1a is kept within the prescribed range, or returns thereto during static conditions.

Figure 3:
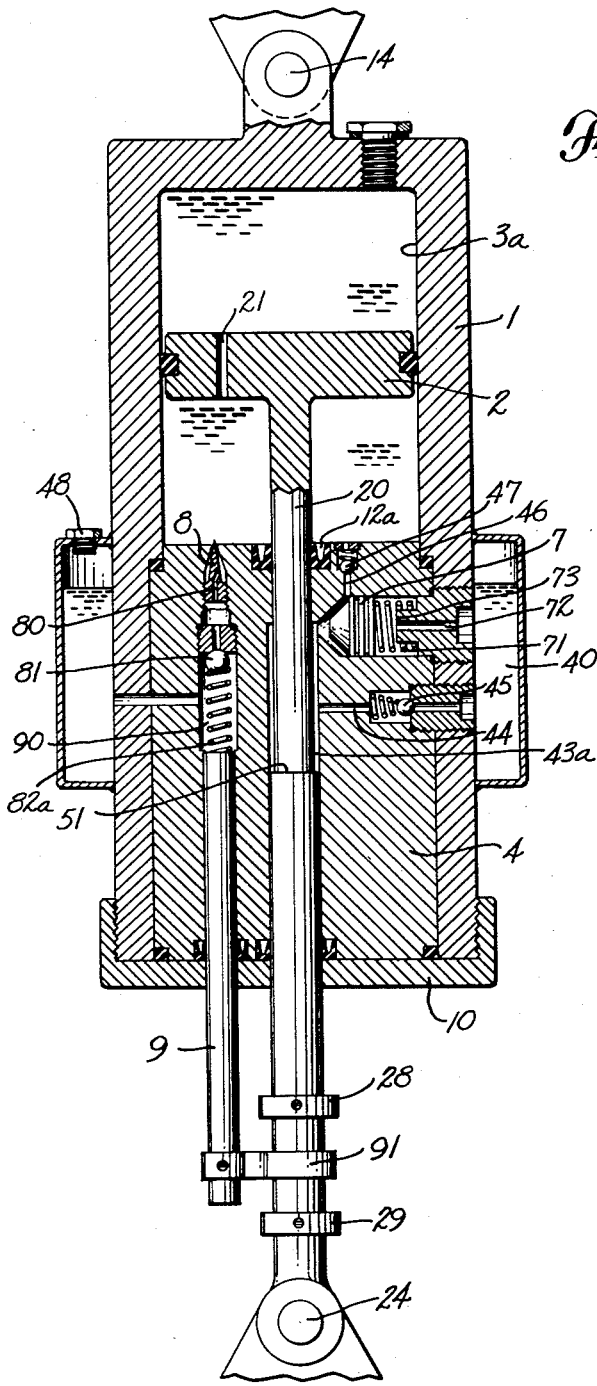
FIGURE 3 is an axial sectional view of a liquid spring shock absorber and of a recuperator of this invention built into the same, the parts again being shown in a substantially static load condition.

The pumping recuperator of this invention is shown in FIGURE 3 integrally incorporated with a liquid spring, rather than separate therefrom.

The pump plunger in this instance is formed as a shoulder 51 formed upon the piston rod 20. The floating piston 7 and associated parts are as before, as are the passages and non-return valves controlling flow through the same between the pump chamber 43a and the reservoir, and the hydraulic chamber 3a, respectively. The principal functional difference between the form shown in FIGURE 3 and that shown in Figures 1 and 2, is that a plunger 9 is reciprocable within a chamber 90 to control the leakage path, being coupled through a metering device such as the collar 91 between two collars 28 and 29 adjustably fixed on the external extension of the piston rod. The plunger 9 is reciprocated only during such time as the pump plunger 51 is moving beyond its normal range. This plunger 9 by tightening or slackening the spring pressure that holds valve 81 to its seat, controls movement through the leakage path 80 and past the non-return valve 81 back into the reservoir 40, when there is an excess of liquid within the body at 3a, and in particular insures closure of the leakage path during the pressure stroke of the plunger 51, or relaxation of the spring 82a to permit leakage until any excess liquid within the chamber 3a has leaked back to the reservoir 40, under static conditions, for example.

When there is a deficiency of liquid in the space 3a the pump plunger 51 will, of necessity, move with the piston rod 20 and the piston 2 past the lower limit of its normal range, causing the floating piston 7 to seat upon the abutment at 73 and, by further movement of the pump plunger, causing liquid to be expelled by way of the passage 46 and past the non-return valve 47 into the body at 3a.

I claim as my invention:

1. A recuperator for automatically maintaining a substantially constant mass volume of liquid within a hydraulic chamber which has means to effect fluctuations in the cubic volume of contained liquid, said recuperator comprising a liquid reservoir, a pump chamber having three passages, one affording communication between said reservoir and said pump chamber, and the other two between said pump chamber and said hydraulic chamber, for supply of liquid to and return of liquid from the hydraulic chamber, a pump plunger reciprocable within the pump chamber, means for operatively interconnecting said pump plunger and the fluctuation-effecting means to reciprocate said pump plunger, normally closed non-return valve means in the passages intermediate the pump cylinder and each of the reservoir and the hydraulic chamber for directing liquid from the reservoir to the pump cylinder and thence to the hydraulic chamber, a metering chamber having two passages freely communicating, respectively, with the reservoir and with the pump cylinder, a free-floating piston reciprocable within said metering chamber and blocking communication between its two passages, yieldable means biasing said floating piston away from the passage which communicates with the reservoir, and means limiting the movement of the floating piston towards the latter passage, under the influence of a pressure stroke of the pump plunger, in opposition to said yieldable means, to stop such movement of the floating piston after so much movement as corresponds with movement of the pump plunger to the normal limit of its pressure stroke at the optimum liquid volume within the hydraulic chamber.

2. A recuperator as in claim 1, including passage means open continuously for bleeding liquid from the hydraulic chamber to a lower pressure region, a valve and a spring urging the same to its seat to stop such leakage, and means operatively connecting the pump plunger to said spring to increase the spring's force sufficiently to hold the valve seated during the compression stroke of the pump plunger, but relaxing the spring's force at other times sufficiently to relieve any pressure in the hydraulic chamber in excess of a predetermined upper limit.

3. A recuperator as defined in claim 1, including means to adjust the position of the floating piston limiting means in the pump plunger's path, to vary the normal limit of the pump plunger's stroke, at which delivery begins.

4. A recuperator for automatically maintaining a substantially constant mass volume of liquid within a hydraulic chamber which has means to effect fluctuations in the cubic volume within said chamber normally within a range above a lower limit, said recuperator comprising, in combination, a liquid reservoir, a pump means including a pump chamber and a pump plunger reciprocable therein, means for operatively connecting said fluctuation-effecting means with the pump plunger to reciprocate the latter through a normal range consonant with the normal range of cubic volume fluctuation within the hydraulic chamber, and beyond such normal range upon the occurrence of abnormal fluctuation within the hydraulic chamber, valved passages, including a first passage between the pump chamber and the hydraulic chamber for return of liquid from the hydraulic chamber to the pump chamber, a second passage between the pump chamber and the hydraulic chamber for supply of liquid to the hydraulic chamber, and a third passage between the reservoir and the pump chamber arranged for supply of liquid to the latter, a metering device including a metering chamber and a floating piston reciprocable therein between limit positions, passages freely connecting the ends of the metering chamber at opposite sides of the floating piston with the reservoir and with the pump cylinder, respectively, yieldable means biasing the floating piston away from the end which communicates with the reservoir, into one limit position, whereby the floating piston is displaced in opposition to the yieldable means, with each stroke of the pump plunger towards the opposite limit position, and abutment means positioned to engage the floating piston at the last-mentioned limit position, to halt such movement of the floating piston after so much movement as corresponds with the normal range of reciprocation of the pump plunger during fluctuations through the normal range within the hydraulic chamber.

5. A recuperator for automatically maintaining a substantially constant mass volume of liquid within a hydraulic chamber which has means to effect fluctuations in the cubic volume of contained liquid, said recuperator comprising, in combination, a liquid reservoir, a pump cylinder and a pump plunger reciprocable therein, means for operatively connecting such fluctuation-effecting means and said plunger to reciprocate the plunger between normal limits which correspond to the normal range of cubic volume change, and beyond such normal limits whenever the cubic volume change is abnormal, first and second valved passages between the pump cylinder and the hydraulic chamber, to direct liquid from the pump cylinder to the hydraulic chamber, and return, respectively, and a third valved passage connecting the reservoir to the pump cylinder for supply of liquid to the latter, a metering chamber and a floating piston reciprocable therein and blocking communication between its respective ends, passages connecting the opposite ends of the metering chamber respectively with the reservoir and with the pump cylinder, yieldable means biasing the floating piston away from the end which communicates with the reservoir, whereby the floating piston is moved in opposition to the yieldable means, with each pressure stroke of the pump plunger towards the last-mentioned end, and means to halt such movement of the floating piston after so much movement as corresponds with the normal limit of the pressure stroke of the pump plunger at optimum cubic volume within the hydraulic chamber, whereby a plunger pressure stroke beyond such limit displaces liquid into the hydraulic chamber.

6. A recuperator as in claim 5, including a spring-seated valve in the passage between the pump cylinder and the hydraulic chamber, the spring of said valve being sufficiently stronger than the yieldable biasing means of the floating piston to retain the valve seated during reciprocation of the pump plunger within its normal limits, and to open the valve only following halting of the movement of the floating piston during its pressure stroke beyond the normal limit.

7. A recuperator as in claim 5, wherein the means for halting movement of the floating piston is adjustable lengthwise of the metering chamber, to vary the point at which movement of the floating piston is halted.

8. A recuperator as in claim 5, including also a leakage path between the hydraulic chamber and the pump cylinder, means to limit the rate of leakage therethrough to a predetermined low rate, and non-return valve means to control the sense of leakage, from the hydraulic chamber, and to prevent leakage in the reverse sense.

9. A recuperator as in claim 8, including means coordinated with the pressure and the suction strokes of the pump plunger to seat the non-return valve means the more strongly with each pressure stroke of the plunger, and to permit leakage through the leakage path only at times other than during such a pressure stroke of the plunger.

10. A recuperator as in claim 8, wherein the non-return valve is located adjacent an end of the pump cylinder, and a compression spring within the pump cylinder and interposed between the pump plunger and said non-return valve, to urge the latter to its seat, and to increase the seating pressure upon the non-return valve with each pressure stroke of the pump plunger.

11. In combination with a hydraulic cylinder containing a body of liquid and a piston reciprocable therein and cooperating with the liquid for absorbing shocks or the like, a piston rod projecting from said piston through a head of the cylinder, a pump cylinder surrounding the piston rod and a pump piston formed on the piston rod and reciprocable therewith, a liquid reservoir, valved passages between the pump cylinder and each of the reservoir and the hydraulic cylinder, to direct liquid from the reservoir to the hydraulic cylinder by way of the pump cylinder, a metering chamber and a floating piston reciprocable therein and blocking communication between its opposite ends, passages connecting the opposite ends of the metering chamber respectively with the reservoir and with the pump cylinder, yieldable means biasing the floating piston away from the end which communicates with the reservoir, whereby the floating piston is moved, in opposition to the yieldable means, with each pressure stroke of the pump plunger towards the last-mentioned end, and means to halt such movement of the floating piston after so much movement as corresponds with the normal limit of the pressure stroke of the pump plunger and of the reciprocatory movement in the corresponding sense of the piston within its hydraulic cylinder, at optimum cubic volume within the latter cylinder, whereby a plunger and piston stroke beyond such normal limit will displace liquid from the pump cylinder into the hydraulic cylinder.

12. The combination of claim 11, a leakage path connecting the hydraulic cylinder and the reservoir, means in such path to control the rate of leakage therethrough, and means to maintain said leakage path closed except as the piston rod and pump plunger move past the normal limit of their reciprocation on the suction stroke of the plunger.

13. The combination of claim 11, wherein a cylinder head is formed with passages affording a leakage path between the hydraulic cylinder and the reservoir, means to control the leakage rate by way of such leakage path, a non-return valve in said leakage path, a leakage chamber interposed in said leakage path intermediate said non-return valve and the reservoir, an auxiliary plunger reciprocable within said leakage chamber, an operative connection between the piston rod and the auxiliary plunger, whereby the pressure strokes of the two plungers coincide, and compression spring means interposed between the non-return valve and the auxiliary plunger, urging the valve more strongly to its seat with each pressure stroke of the plungers.

References Cited in the file of this patent
UNITED STATES PATENTS

| | | |
|---|---|---|
| 1,198,643 | Liebau | Sept. 19, 1916 |
| 1,291,016 | Kellogg | Jan. 14, 1919 |
| 1,340,233 | Liebau | May 18, 1920 |
| 2,436,573 | Heynes | Feb. 24, 1948 |
| 2,780,173 | Herbrich | Feb. 5, 1957 |
| 2,879,057 | Heiss | Mar. 24, 1959 |